United States Patent
Cariou et al.

(10) Patent No.: US 11,596,021 B2
(45) Date of Patent: Feb. 28, 2023

(54) EHT STA CONFIGURED TO OPERATE IN NON-AP MULTI-LINK DEVICE (MLD) WITH BEACON TO INDICATE LINK PARAMETER UPDATE

(71) Applicant: Intel Corporation, Santa Clara, CA (US)

(72) Inventors: Laurent Cariou, Portland, OR (US); Po-Kai Huang, San Jose, CA (US); Minyoung Park, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 17/012,552

(22) Filed: Sep. 4, 2020

(65) Prior Publication Data

US 2020/0404737 A1    Dec. 24, 2020

Related U.S. Application Data

(60) Provisional application No. 62/896,254, filed on Sep. 5, 2019.

(51) Int. Cl.
| | |
|---|---|
| *H04W 4/00* | (2018.01) |
| *H04W 76/28* | (2018.01) |
| *H04W 76/15* | (2018.01) |
| *H04W 88/08* | (2009.01) |
| *H04W 88/02* | (2009.01) |
| *H04W 84/12* | (2009.01) |

(52) U.S. Cl.
CPC .......... *H04W 76/28* (2018.02); *H04W 76/15* (2018.02); *H04W 84/12* (2013.01); *H04W 88/02* (2013.01); *H04W 88/08* (2013.01)

(58) Field of Classification Search
CPC ..... H04W 76/28; H04W 76/15; H04W 84/12; H04W 88/02; H04W 88/08; H04W 52/0216; H04W 48/12; H04W 48/14; Y02D 30/70
USPC ......................................................... 370/328
See application file for complete search history.

(56) References Cited

U.S. PATENT DOCUMENTS

| | | | |
|---|---|---|---|
| 2019/0097850 A1* | 3/2019 | Kenney | H04L 5/0044 |
| 2019/0116513 A1* | 4/2019 | Verma | H04L 27/2666 |
| 2020/0221545 A1* | 7/2020 | Stacey | H04W 48/16 |

* cited by examiner

*Primary Examiner* — Huy C Ho
(74) *Attorney, Agent, or Firm* — Schwegman Lundberg & Woessner, P.A.

(57) ABSTRACT

Embodiments of a non-access point (non-AP) EHT station (EHT STA) configured to operate as part of an STA multi-link logical entity (STA MLLE) comprising the EHT STA and one or more other non-AP EHT STAs are generally described herein. The STA MLLE is configured to be associated with an access point (AP) MLLE (AP MLLE) comprising a plurality of EHT APs. The EHT STA is configured to decode a beacon frame received from the EHT APs of the AP MLLE including a multi-link beacon check element to indicate which of the one or more multiple links has a critical update to its link parameters. When the multi-link beacon check element indicates an update to link parameters for the link between the EHT STA and its associated EHT AP, the EHT STA is to configured obtain the updated link parameters either waking-up at a target beacon transmission time (TBTT) or send a probe request.

20 Claims, 4 Drawing Sheets

Multi-link Beacon Check element

FIG. 3

Multi-link Beacon Check element

FIG. 4

Multi-link Beacon Check element with single beacon update counter per AP MLLE

EHT STA CONFIGURED TO OPERATE IN NON-AP MULTI-LINK DEVICE (MLD) WITH BEACON TO INDICATE LINK PARAMETER UPDATE

PRIORITY CLAIM

This application claims priority under 35 USC 119(e) to U.S. Provisional Patent Application Ser. No. 62/896,254, filed Sep. 5, 2019 [reference number AC4769-Z] which is incorporated herein by reference in its entirety.

TECHNICAL FIELD

Embodiments pertain next-generation (NG) wireless local area networks (WLANs) (i.e., Extremely High Throughput (EHT), including the IEEE 802.11be draft standard. Some embodiments relate to multi-link logical entities (MLLEs). Some embodiments relate to updating link parameters in MLLEs.

BACKGROUND

In a WLAN, stations (STAs) and access points (APs) communicate over wireless links. One issue with WLANs is that the STAs need to make sure they communicate using the proper link parameters. This is particularly important for multi-link operation in EHT configured WLANs.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
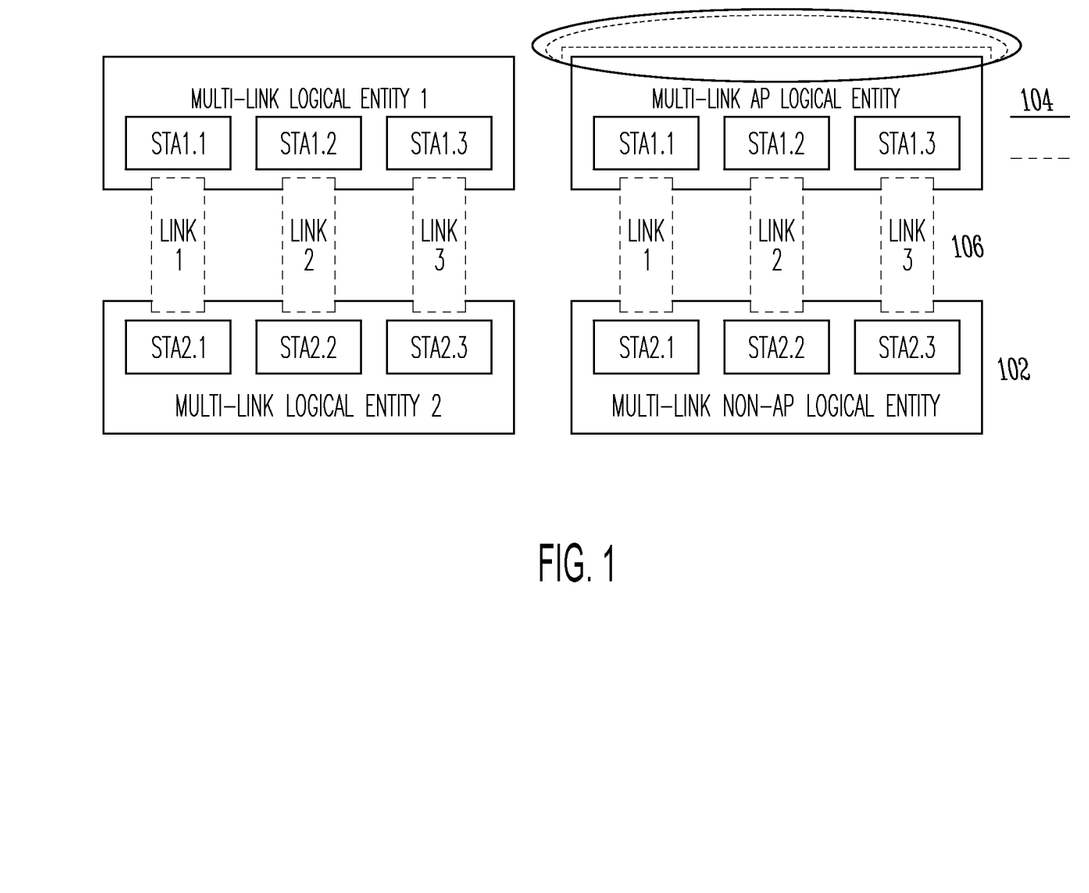
FIG. 1 illustrates the operation of a station (STA) multi-link logical entity (STA MLLE) and an access point (AP) MLLE in accordance with some embodiments.

FIG. 1 illustrates the operation of a station (STA) multi-link logical entity (STA MLLE) and an AP MLLE in accordance with some embodiments. As shown in FIG. 1, STA multi-link logical entity (STA MLLE) 102 comprise a plurality of non-AP EHT STAs and an access point (AP) MLLE (AP MLLE) 104 comprising a plurality of EHT APs. Each EHT STAs of the STA MLLE is associated with one of the EHT APs of the AP MLLE and communicate with the associated EHT AP over a link of one or more multiple links 106 between the STA MLLE and the AP MLLE including an anchor link.

In some embodiments, an EHT STA is configured to decode a beacon frame received from the EHT APs of the AP MLLE including a multi-link beacon check element (see FIG. 2, FIG. 3 or FIG. 4) to indicate which of the one or more multiple links has a critical update to its link parameters. When the multi-link beacon check element indicates an update to link parameters for the link between the EHT STA and its associated EHT AP, in some embodiments the EHT STA may be configured obtain the updated link parameters by either waking-up at a target beacon transmission time (TBTT) to receive the updated link parameters in a beacon frame transmitted by the associated EHT AP, or sending a probe request to the associated EHT AP to request the updated link parameters. In some embodiments, the multi-link beacon check element is received in at least all delivery traffic indication map (DTIM) beacon frames to allow each of the EHT STAs of the STA MLLE to monitor a single link and obtain link parameter updates for the multiple links. These embodiments are described in more detail below.

In some embodiments, the multi-link beacon check element includes a beacon check bitmap. In these embodiments, each bit of the bitmap corresponds to a link for one or more multiple links between the STA MLLE and the AP MLLE. In these embodiments, a set bit of the bitmap indicates to the EHT STAs which of the links have updated link parameters.

In some embodiments, the multi-link beacon check element 200 (e.g., illustrated in FIG. 2) comprises a link ID bitmap 208 comprising link IDs of the multiple links. In these embodiments, the link ID bitmap may indicate which of the multiple links have updated link parameters. In these embodiments, when a bit of the link ID bitmap corresponding to the link ID is set (e.g., to 1), there may be critical updates to the link parameters for that link.

In some embodiments, the multi-link beacon check element 300 (e.g., illustrated in FIG. 3) comprises: a link ID bitmap 308; and a beacon update counter field 310. In these embodiments, the beacon update counter field 310 may include a beacon update counter for each of the multiple links. In these embodiments, the beacon update counters are configured to be incremented to indicate that link parameters for an associated link have been updated. In some embodiments, the link ID bitmap 308 indicates link IDs of the links of the multiple links for which the beacon update counter is updated.

In some embodiments, the multi-link beacon check element 400 (e.g., illustrated in FIG. 4) comprises a single beacon update counter 410 for the AP MLLE and a link ID bitmap 408. The single beacon update counter 410 may indicate an update to the link parameters for at least one of the multiple, the link ID bitmap 408 comprising one or more link IDs to indicate which of the links have updated link parameters. In these embodiments, each EHT STA of the STA MLLE may read the link ID bitmap 408 to determine which link has updated parameters. If the updated parameters are for that STA's link, that STA may then obtain the updated link parameters (either in a beacon frame from its associated EHT AP or in response to a probe request as discussed above).

Figure 2:
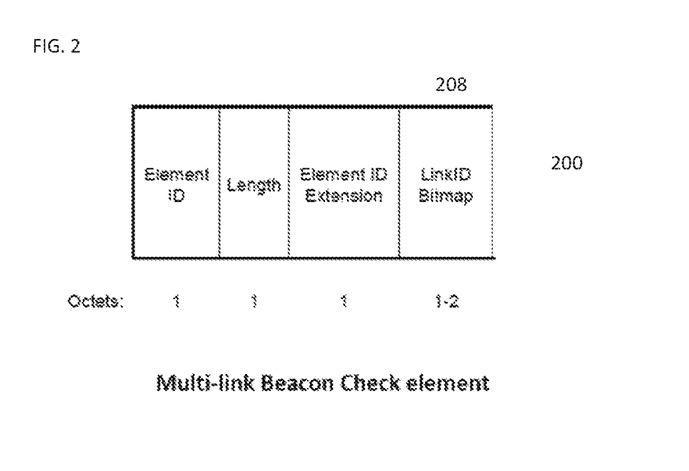
FIG. 2 illustrates a multi-link beacon check element in accordance with some embodiments.
Figure 3:
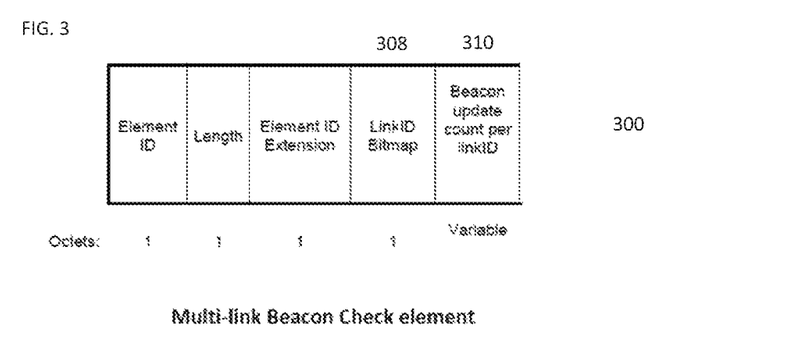
FIG. 3 illustrates a multi-link beacon check element in accordance with some other embodiments.
Figure 4:
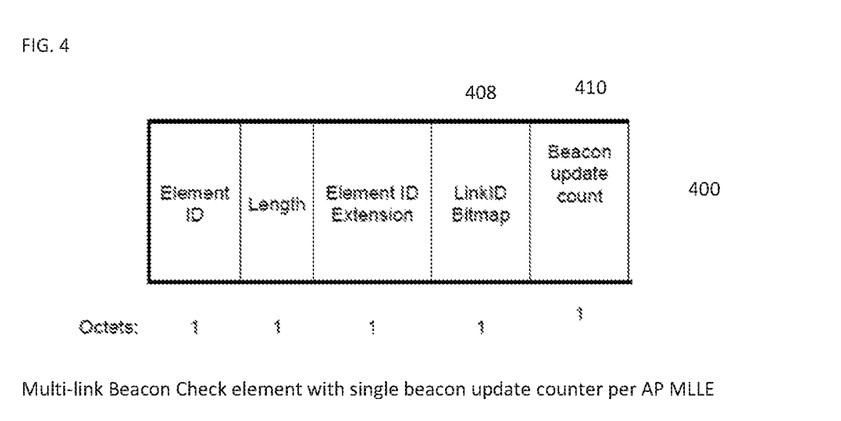
FIG. 4 illustrates a multi-link beacon check element in accordance with some other embodiments.

In some embodiments, when the EHT STA sends the probe request to request the updated link parameters, the processing circuitry of the EHT STA is configured to include a multi-link beacon check element 200, 300 or 400 (illustrated in FIG. 2 or FIG. 3 or FIG. 4, respectively] in the probe request. In these embodiments, the EHT AP may respond to the probe request with a probe response that includes the link updated parameters for the requested link. In some alternative embodiments, the multi-link beacon check element may be included in a probe response.

In some embodiments, the EHT STA may be further configured to encode a probe request frame for transmission to the associated EHT AP of the AP MLLE. In these embodiments, the probe request frame may include a request element comprising one or more link IDs of the one or more multiple links. In these embodiments, the EHT STA may be further configured to decode a probe response frame received in response to the probe request frame. The probe response frame may indicate whether any of the one or more links identified by the link IDs in the request element have updated link parameters.

In some embodiments, when the AP MLLE is configured to send full beacon frames in the anchor link and short beacon frames comprising in traffic-indication map (TIM) frames in other of the multiple links, the processing circuitry of the EHT STA is configured to decode the multi-link beacon check element received on the other links in the TIM frames. In these embodiments, the short beacon frame (TIM frame) may include the updated link parameters to allow the EHT STA to receive the updated link parameters without having to send a probe request.

In some embodiments, the EHT STAs of the STA MLLE utilize a same MAC address. In some embodiments, the multi-link beacon check element to indicate which of the one or more multiple links has a critical update to its link parameters. In some embodiments, the processing circuitry of the EHT STA is configured to store the updated link parameters for any of the links of the multiple links in the memory, when updated.

Some embodiments are directed to extremely high-frequency (EHT) access point (AP) station (EHT AP). In these embodiments, the EHT AP is configured to operate as part of an AP multi-link logical entity (AP MLLE) 104 comprising the EHT AP and one or more other EHT APs. In these embodiments, the AP MLLE 104 configured to be associated with a non-AP station (STA) MLLE (STA MLLE) 102 comprising a plurality of EHT STAs. In these embodiments, when operating as part of the AP MLLE, the EHT AP is configured to encode a beacon frame for transmission to the EHT STAs of the STA MLLE. The beacon frame may include a multi-link beacon check element to indicate which of the one or more multiple links has an update to its link parameters. In these embodiments, when the multi-link beacon check element indicates an update to link parameters for the link between one of the EHT STAs that is associated with the EHT AP, the EHT AP may encode a beacon frame for transmission to the associated EHT STA at a target beacon transmission time (TBTT) to provide the associated EHT STA with the updated link parameters in the beacon frame or decode a probe request receive from the associated EHT STA requests the updated link parameters. In some embodiments, the EHT AP may be configured to encode the multi-link beacon check element for transmission in at least delivery traffic indication map (DTIM) beacon frames to allow the EHT STAs of the STA MLLE to monitor a single link and obtain link parameter updates for the multiple links 106.

Beacon frames are sent generally every 100 ms, and carry, among others, the different elements that describe the capabilities and operation of the AP/BSS, and that describe specific features that are enabled by the access point (AP). The station device (STA) has to keep track of these parameters that are governing their operation in the BSS, and make sure that it has an updated version of these parameters.

Current beacon frames do not contain an update counter field, which could be used to figure out if some changes have been made to these parameters. Because of that, the STAs have to regularly listen to beacons and check if they need to update some of the parameters in their memory.

With the traffic indication map (TIM) broadcast, the AP sends TIM frames containing a TIM element at different instants than the beacon frame. If TIM broadcast is negotiated to be used by a STA with its associated AP, the STA can know when the TIM frames will be sent to him and can simply listen to these frames and skip the beacon frames (where they usually read the TIM information: information whether the AP has buffered traffic for them or not). The TIM frame therefore contains a field called "Check Beacon", which is set to 1 if the AP has made a critical change in the parameters described in the beacons (enhanced distributed channel access (EDCA) parameter changes, operation element change, . . . ), and set to 0 if nothing has changed. If a STA receives a TIM frame with the Check Beacon field set to 1, it shall wake up at a future TBTT (target beacon transmission time) to receive a beacon and update its memory with the new parameters, or it shall send a probe request to the AP so that the AP responds with a probe response that will contain these parameters updates.

An AP MLLE operating on three links has three different APs (one on each link). In the typical scenario where each of these APs will need to allow legacy STAs to associate, each of these APs will be sending a beacon frame to describe its own operation and/or capabilities and/or parameters. In another scenario, where some APs (for instance at 6 GHz) don't allow legacy STAs to associate (in auxiliary links, and EHT STAs are only allowed to associate on the anchor link), it is believed that a beacon will be transmitted by these auxiliary link APs for several reasons (indicate presence of the AP to $3^{rd}$ party APs, include the TIM information, include TWT elements . . . ) now these beacons may contain less information, but will be transmitted. Some companies believe that such beacon will not be transmitted by the auxiliary link APs, and that all information will be contained in the beacon of the anchor link.

An EHT STA MLLE 102 that is associated with an AP MLLE 104, and that can operate on multiple links 106 (simultaneously or not), may need to monitor all the beacons sent by all the APs of the AP MLLE. This generates a lot of power consumption issues. Thus, there is a need to try and find solutions so that a STA only needs to monitor the beacons of a single link, and not necessarily the same link all the time.

Example embodiments of the present disclosure relate to systems, methods, and devices for critical beacon update for multi-link. In one embodiment, a multi-link beacon system may facilitate that an AP that is part of an AP multi-link logical entity (MLLE) may include indicators in the beacon frames it transmits. In some embodiments, the beacon frame may include In some embodiments, the beacon frame may include a field or an element, that indicates, for each of the other APs in the same AP MLLE, if there has been a critical update of parameters in the beacon frame transmitted by that AP. This field can be called "beacon check bitmap" and be a bitmap with each bit (linkID) corresponding to an AP of the AP MLLE and may be set to 1 if there has been a critical update and to 0 if not. A STA that receives this element in a beacon with the bit in the "beacon check bitmap" set to 1, corresponding to an AP of the AP MLLE, shall wake up on the link of this AP at a TBTT to receive the updated parameters from the beacon frame transmitted by this AP.

In some embodiments, the beacon frame may include an element, that contains, for each of the other APs in the same AP MLLE, a "beacon update counter" that contains the value from the last parameter change. Every time there is a change of parameter in the beacon from an AP in the same AP MLLE, the beacon update counter corresponding to that AP is increased by 1. A STA that receives this element in a beacon for the first time stores these beacon update values in its memory along with the parameters for each link. When receiving this element in future beacons, it simply compares, for each of the APs in the AP MLLE (at least for each of the links that it can talk to), the beacon update value received with the beacon update value it stored. If the value is different, the STA shall wake up in the link of that AP at the TBTT to receive the beacon and collect the updated information, or send a probe request to that AP.

In some embodiments, the beacon frame may include, the element can also be included in probe request. If a STA sends a probe request with a beacon update counter, then the AP will respond with a probe response that include only the elements that have changed between the current beacon update counter and the beacon update counter that is included in the probe response. In some embodiments, the beacon frame may include the element can also be included in probe response.

In order to save overhead, some embodiments provide a single beacon update counter per AP MLLE. Every time there is a new update in any of the links, the update counter is incremented by 1. The element that is included in beacons include the beacon update counter and a bitmap of the linkIDs indicating on which link or links the last critical update was done. On reception of this element, if the update counter received does not match the one that the STA had in memory (but is equal to the one it had in memory+1), that means that there has been a critical update. The STA then reads the bitmap to see which link had an update, and to see to which link the STA has to go and receive a beacon to receive the updated parameters.

In one or more embodiments, a multi-link beacon system may facilitate that a probe request sent by a STA to an AP that is part of an AP MLLE, can include one or more linkIDs (or a bitmap of linkIDs) of the other APs in the AP MLLE in a request element. Upon reception of that request, the AP shall respond with a probe response describing also the other APs in the AP MLLE that are identified by the linkIDs.

In the multi-link framework illustrated in FIG. 1, there are two multi-link logical entities on either side which includes multiple STAs that can setup link with each other. The detailed definition is shown below.

Multi-link logical entity: A logical entity that contains one or more STAs. The logical entity has one MAC data service interface and primitives to the LLC and a single address associated with the interface, which can be used to communicate on the DSM.

In these embodiments, a multi-link logical entity allows STAs within the multi-link logical entity to have the same MAC address. For infrastructure framework, there is a Multi-link AP logical entity, which includes APs on one side, and Multi-link non-AP logical entity, which includes non-APs on the other side. The detailed definition is shown below.

Multi-link AP logical entity (AP MLLE): A multi-link logical entity, where each STA within the multi-link logical entity is an EHT AP.

Multi-link non-AP logical entity (non-AP MLLE): A multi-link logical entity, where each STA within the multi-link logical entity is a non-AP EHT STA. Note that this framework is a natural extension from the one link operation between two STAs, which are AP and non-AP STA under infrastructure framework.

FIG. 2 illustrates a multi-link beacon check element 200 in accordance with some embodiments. This multi-link beacon check element 200 may include in beacons/probe response the linkID of the APs that are part of the same AP MLLE as the AP sending the beacon/probe response for which there is a critical update of parameter changes (bit corresponding to the linkID (in linkID bitmap field 208) of the AP is set to 1 to indicate critical update). When receiving this element, an associated STA that is part of a STA MLLE that can be using the link (because it has also setup that link with the AP MLLE, . . . ) may have the STA that is part of the STA MLLE and operating on the link identified by the linkID be awake at the TBTT of the corresponding AP to receive the updated information, and have the STA that is part of the STA MLLE and operating on the link identified by the linkID send a probe request to the corresponding AP to receive the updated information. This can be transmitted using the OCT procedure (on-channel tunneling) in the same link at the link used to send the beacon including this element, if the AP MLLE and STA MLLE support the OCT. In these embodiments, the STA may send a probe request to the AP that sent the beacon with this element, with a request field indicating the linkID of the corresponding AP, to receive the updated information for the corresponding AP. (if this functionality is defined).

FIG. 3 illustrates a multi-link beacon check element 300 in accordance with some other embodiments. This element could be defined to cover another embodiment of this disclosure. In these embodiments, the linkID bitmap 308 indicates LinkIDs for which there is a Beacon Update Count Per LinkID fields 310 present in the element: if bit corresponding to linkID is set to 1, then a Beacon Update Count Per LinkID field is included. If there are multiple bits that are set to 1, the Beacon Update Count Per LinkID fields are included in order.

In these embodiments, the Beacon Update Count Per LinkID field contains a Beacon Update Count, which corresponds to the value corresponding to the last time a critical change of parameters was done by the AP corresponding to the LinkID. It assumes the following: this AP always include a Beacon Update Count field or element in the beacon frames/probe response frames it transmits and increment this field by one every time it changes a parameter (EDCA parameters, operating mode change, . . . ). Other designs may have the same functionalities:

These embodiments may include a field indicating how many "Per AP information" fields are present in the element. These embodiments may include an each "per AP information" field includes a LinkID field to describe the AP (or the MAC address of the AP if the LinkID concept is not used), and the Beacon Update counter field. With this element, more functionalities may be possible as described previously: A STA MLLE can keep track precisely of the updates on each of the links it has setup.

This element shall be present in all beacons, or at least DTIM beacons of all APs that are part of the AP MLLE, so that the STA can monitor only one link and get the update on all other links. As the STA MLLE will select one link to monitor the DTIM beacon and receive group address frames, it makes sense that that's where it will read this element to keep track of the updates from other links.

If the AP MLLE has a mode of operation where it sends only full beacons in an anchor link, and only short beacons or TIM frames in the other links, then all beacons or at least all DTIM beacons from that link shall include that element (unless it includes already a full multi-link element containing all the information for all APs of the AP MLLE).

The Short beacon, or TIM frame (or other frame) that is transmitted in the other links shall also include that element. Note that if there is a critical update, the Short beacon should include the changed parameters at least for a certain duration so that the STA can get the information right away without sending a probe request (note that the probe request may be governed by a multi-link policy and may only be allowed to be sent in some links).

FIG. 4 illustrates a multi-link beacon check element 400 in accordance with some other embodiments. In order to save overhead, this option may be used where there is a single beacon update counter per AP MLLE. Every time there is a new update in any of the links, the update counter is incremented by 1. The element that is included in beacons include the beacon.

The update counter 410 and a bitmap 408 of the linkIDs indicating on which link or links the last critical update was done. On reception of this element, if the update counter received does not match the one that the STA had in memory (but is equal to the one it had in memory+1), that means that there has been a critical update. The STA then reads the bitmap to see which link had an update, and to see to which link the STA has to go and receive a beacon to receive the updated parameters.

On reception of this element, if the update counter received does not match the one that the STA had in memory (but is equal to the one it had in memory+ more than 1), that means that there has been a critical update, but that the STA also missed the previous critical update. The bitmap in that case does not matter as it only relates to the last update, so in that case, the STA shall make sure it listens to all beacons in all its setup links to get an updated version.

The STA then reads the bitmap to see which link had an update, and to see to which link the STA has to go and receive a beacon to receive the updated parameters. It is understood that the above descriptions are for purposes of illustration and are not meant to be limiting.

Figure 5:
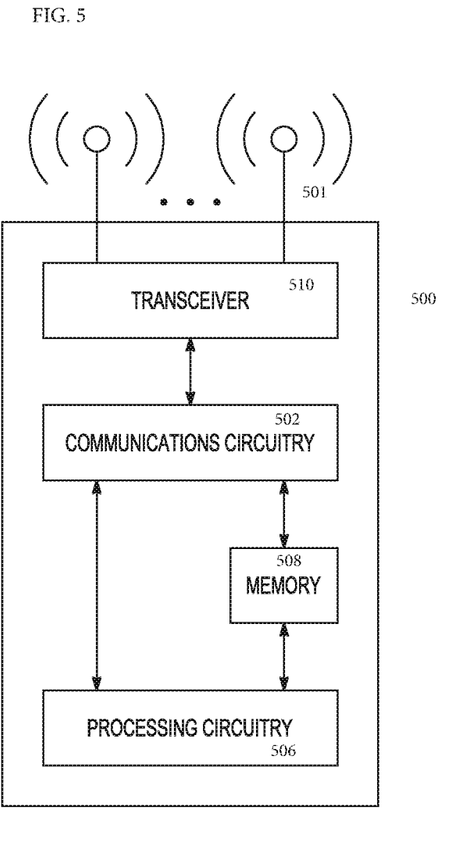
FIG. 5 is a functional block diagram of a wireless communication device in accordance with some embodiments.

FIG. 5 is a functional block diagram of a wireless communication station in accordance with some embodiments. Wireless communication station 500 may be suitable for use as an EHT AP or EHT STA as described above. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety. In some embodiments, the AP and STAs may be EHT APs and EHT STAs configured to communicate in accordance with IEEE 802.11be draft standards for EHT.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-frequency (EHT) EHT non-access point (non-AP) station (EHT STA), the apparatus comprising: processing circuitry; and memory, wherein the EHT STA is configured to operate as part of a non-AP multi-link device (non-AP MLD), the non-AP MLD being a logical entity comprising more than one affiliated non-AP STA including the EHT STA and one or more other non-AP EHT STAs,
wherein when operating as part of the non-AP MLD, the processing circuitry of the EHT STA is configured to:
perform multi-link setup with an EHT AP affiliated with an AP MLD, the AP MLD comprising more than one affiliated EHT AP STA (EHT AP);
decode a beacon frame from an EHT AP of the AP MLD, the beacon frame including a MLD parameters subfield that includes a parameters change count indicator;
determine if a critical update to link parameters has occurred for one of the EHT APs of the AP MLD indicated in the MLD parameters subfield based on whether a value in the parameters change count indicator is different than a previously received value; and
in response to a determination that the critical update to the link parameters has occurred, obtain updated link parameters for the EHT AP indicated in the MLD parameters subfield by performing, at least one of:
attempting to decode a probe beacon frame or probe response frame from the EHT AP indicated in the MLD parameters subfield; and
encoding a probe request frame for transmission to an associated one of the EHT APs of the AP MLD soliciting information of the EHT AP indicated in the MED parameters subfield.

2. The apparatus of claim 1, wherein the non-AP MLD has a single medium access control (MAC) service access point (SAP) to logical link control (LLC), which includes one MAC data service.

3. The apparatus of claim 2, wherein after performance of the multi-link setup procedure, one or more links are enabled between corresponding EHT APs of the AP MILD and non-AP STAs of the non-AP MLD.

4. The apparatus of claim 3, wherein the processing circuitry is further configured to monitor beacon frames from the AP MLD on a single link to obtain link parameter updates for any of the enabled links between the non-AP MILD and the AP MLD, the non-AP MLD using a Single MLD MAC address that identifies the non-AP MILD.

5. The apparatus of claim 4, wherein when the EHT STA sends the probe request to solicit information of the EHT AP indicated in the MILD parameters subfield, the processing circuitry of the EHT STA is configured to encode the probe request to include a multilink ID to identify the AP MILD and a link ID to identify the EHT AP indicated in the MLD parameters subfield of the beacon frame.

6. The apparatus of claim 5, wherein in response to transmission of the probe request, the processing circuitry is configured to decode a probe response received in response to the probe request, the probe response including a multi-link element that includes the multilink ID and the link ID.

7. The apparatus of claim 6, wherein the processing circuitry comprises a baseband processor.

8. The apparatus of claim 7, wherein the memory is configured to store link parameters for the one or more links are enabled between corresponding EHT APs of the AP MLD and non-AP STAs of the non-AP MLD.

9. A non-transitory computer-readable storage medium that stores instructions for execution by processing circuitry of an extremely high-frequency (EHT) EHT non-access point (non-AP) station (EHT STA),
wherein the EHT STA is configured to operate as part of a non-AP multi-link device (non-AP MLD), the non-AP MLD being a logical entity comprising more than one affiliated non-AP STA including the EHT STA and one or more other non-AP EHT STAs,
wherein when operating as part of the non-AP MED, the processing circuitry of the EHT STA is configured to:
perform multi-link setup with an EHT AP affiliated with an AP MLD, the AP MLD comprising more than one affiliated EHT AP STA (EHT AP);
decode a beacon frame from an EHT AP of the AP MILD, the beacon frame including a MED parameters subfield that includes a parameters change count indicator;
determine if a critical update to link parameters has occurred for one of the EHT APs of the AP MLD indicated in the MED parameters subfield based on whether a value in the parameters change count indicator is different than a previously received value; and
in response to a determination that the critical update to the link parameters has occurred, obtain updated link parameters for the EHT AP indicated in the MLD parameters subfield by performing, at least one of:
attempting to decode a probe beacon frame or probe response frame from the EHT AP indicated in the MED parameters subfield; and
encoding a probe request frame for transmission to an associated one of the EHT APs of the AP MILD soliciting information of the EHT AP indicated in the MILD parameters subfield.

10. The non-transitory computer-readable storage medium of claim 9, wherein the non-AP MLD has a single medium access control (MAC) service access point (SAP) to logical link control (LLC), which includes one MAC data service.

11. The non-transitory computer-readable storage medium of claim 10, wherein after performance of the multi-link setup procedure, one or more links are enabled between corresponding EHT APs of the AP MLD and non-AP STAs of the non-AP MLD.

12. The non-transitory computer-readable storage medium of claim 11, wherein the processing circuitry is further configured to monitor beacon frames from the AP MLI) on a single link to obtain link parameter updates for any of the enabled links between the non-AP MLD and the AP MLI), the non-AP MLD using a Single MLD MAC address that identifies the non-AP MLD.

13. The non-transitory computer-readable storage medium of claim 12, wherein the EHT STA sends the probe request to solicit information of the EHT AP indicated in the MLD parameters subfield, the processing circuitry of the EHT STA is configured to encode the probe request to include a multilink ID to identify the AP MILD and a link ID to identify the EHT AP indicated in the MLD parameters subfield of the beacon frame.

14. The non-transitory computer-readable storage medium of claim 13, wherein in response to transmission of the probe request, the processing circuitry is configured to decode a probe response received in response to the probe request, the probe response including a multi-link element that includes the multilink ID and the link ID.

15. An apparatus of an extremely high-frequency (EHT) EHT access point (AP), the apparatus comprising: processing circuitry; and memory,
wherein the EHT AP is configured to operate as part of a AP multi-link device (AP MLD), the AP MILD being a logical entity comprising more than one affiliated EHT APs including the EHT AP and one or more other AP EHTs,
wherein when operating as part of the AP MLD, the processing circuitry of the EHT AP is configured to:
perform multi-link setup with an EHT station (STA) affiliated with non-AP MLD, the non-AP MLD comprising more than one affiliated EHT STA (EHT STAs);
encode a beacon frame for transmission from an EHT AP of the AP MLD, the beacon frame including a MUD parameters subfield that includes a parameters change count indicator;
wherein when a critical update to link parameters has occurred for one of the EHT APs of the AP MILD, the processing circuitry is configured to indicate the critical update to link parameters in the MLD parameters subfield by incrementing a value in the parameters change count indicator; and
when the critical update to the link parameters is indicated, the processing circuitry is configured to at least one of:
encode a beacon frame or probe response frame for transmission to one of the EHT STAs; and
decode a probe request frame from one of the EHT STAs soliciting information of the EHT AP indicated in the MLD parameters subfield.

16. The apparatus of claim 15, wherein the AP MLD has a single medium access control (MAC) service access point (SAP) to logical link control (LLC), which includes one MAC data service.

17. The apparatus of claim 16, wherein after performance of the multi-link setup procedure, one or more links are enabled between corresponding EHT APs of the AP MILD and non-AP STAs of the non-AP MLD.

18. The apparatus of claim 17, wherein the processing circuitry is further configured to encode beacon frames for transmission by the AP MLD on a single link to provide link parameter updates for any of the enabled links between the non-AP MILD and the AP MLD, the AP MLD using a single MLD MAC address that identifies the AP MLD.

19. The apparatus of claim 18, wherein when the EHT STA sends the probe request to solicit information of the EHT AP indicated in the MLD parameters subfield, the processing circuitry of the EHT AP is configured to attempt to decode the probe request from the EHT STA that include a multilink ID to identify the AP MLD and a link ID to identify the EHT AP indicated in the MLD parameters subfield of the beacon frame.

20. The apparatus of claim 19, wherein in response to receipt of the probe request, the processing circuitry is configured to encode a probe response to include a multi-link element that includes the multilink ID and the link ID.

* * * * *

UNITED STATES PATENT AND TRADEMARK OFFICE
CERTIFICATE OF CORRECTION

| | |
|---|---|
| PATENT NO. | : 11,596,021 B2 |
| APPLICATION NO. | : 17/012552 |
| DATED | : February 28, 2023 |
| INVENTOR(S) | : Cariou et al. |

It is certified that error appears in the above-identified patent and that said Letters Patent is hereby corrected as shown below:

On the Title Page

Item (57), in "Abstract", in Column 2, Line 14, delete "to configured" and insert --configured to-- therefor In the Claims In Column 9, Line 19, in Claim 1, after "comprising:", insert a linebreak In Column 9, Line 19, in Claim 1, after "memory,", insert a linebreak In Column 9, Line 47, in Claim 1, delete "MED" and insert --MLD-- therefor In Column 9, Line 55, in Claim 3, delete "MILD" and insert --MLD-- therefor In Column 9, Line 61, in Claim 4, delete "MILD" and insert --MLD-- therefor In Column 9, Line 62, in Claim 4, delete "MILD." and insert --MLD.-- therefor In Column 9, Line 65, in Claim 5, delete "MILD" and insert --MLD-- therefor In Column 9, Line 67, in Claim 5, delete "MILD" and insert --MLD-- therefor In Column 10, Line 24, in Claim 9, delete "MED," and insert --MLD,-- therefor In Column 10, Line 31, in Claim 9, delete "MILD," and insert --MLD,-- therefor In Column 10, Line 31, in Claim 9, delete "MED" and insert --MLD-- therefor Signed and Sealed this
Nineteenth Day of March, 2024

Katherine Kelly Vidal
*Director of the United States Patent and Trademark Office*

CERTIFICATE OF CORRECTION (continued)
U.S. Pat. No. 11,596,021 B2

In Column 10, Line 36, in Claim 9, delete "MED" and insert --MLD-- therefor

In Column 10, Line 46, in Claim 9, delete "MED" and insert --MLD-- therefor

In Column 10, Line 48, in Claim 9, delete "MILD" and insert --MLD-- therefor

In Column 10, Line 50, in Claim 9, delete "MILD" and insert --MLD-- therefor

In Column 10, Line 64, in Claim 12, delete "MLI)" and insert --MLD-- therefor

In Column 10, Line 66, in Claim 12, delete "MLI)," and insert --MLD,-- therefor

In Column 11, Line 2, in Claim 13, after "wherein", insert --when--

In Column 11, Line 6, in Claim 13, delete "MILD" and insert --MLD-- therefor

In Column 11, Line 16, in Claim 15, after "comprising:", insert a linebreak

In Column 11, Line 19, in Claim 15, delete "MILD" and insert --MLD-- therefor

In Column 11, Line 29, in Claim 15, delete "MUD" and insert --MLD-- therefor

In Column 11, Line 33, in Claim 15, delete "MILD," and insert --MLD,-- therefor

In Column 12, Line 16, in Claim 17, delete "MILD" and insert --MLD-- therefor

In Column 17, Line 22, in Claim 18, delete "MILD" and insert --MLD-- therefor